United States Patent [19]
Lange

[11] Patent Number: 5,878,765
[45] Date of Patent: Mar. 9, 1999

[54] MICROPROCESSOR-CONTROLLED POSITION REGULATOR

[75] Inventor: Rainer Lange, Neuburg, Germany

[73] Assignee: Schubert & Salzer Control Systems GmbH, Ingolstadt, Germany

[21] Appl. No.: 739,100

[22] Filed: Oct. 25, 1996

[30] Foreign Application Priority Data

Oct. 27, 1995 [DE] Germany .................. 195 40 441.6

[51] Int. Cl.⁶ .................................................. F16K 31/126
[52] U.S. Cl. .................... 137/1; 137/486; 137/487.5; 137/624.11
[58] Field of Search ................ 137/486, 487.5, 137/624.11; 251/129.01, 129.04

[56] References Cited

U.S. PATENT DOCUMENTS

| | | |
|---|---|---|
| 3,552,428 | 1/1971 | Pemberton . |
| 4,813,443 | 3/1989 | Pounder .................. 137/487.5 X |
| 4,934,397 | 6/1990 | Niemela et al. . |
| 4,938,252 | 7/1990 | Piechnick ................ 137/486 |
| 4,991,491 | 2/1991 | Neumann . |
| 5,024,417 | 6/1991 | Voxbrunner . |
| 5,179,330 | 1/1993 | Nikolaus . |
| 5,190,068 | 3/1993 | Philbin . |
| 5,537,388 | 7/1996 | Shinskey . |
| 5,573,032 | 11/1996 | Lenz et al. ................ 137/486 |
| 5,678,601 | 10/1997 | Engel ..................... 137/486 |

FOREIGN PATENT DOCUMENTS

| | | |
|---|---|---|
| 3838353A1 | 5/1990 | Germany . |
| 4417153C1 | 1/1995 | Germany . |
| 4415054C1 | 5/1995 | Germany . |
| 4415055C1 | 5/1995 | Germany . |
| 9506276 | 3/1995 | WIPO . |

OTHER PUBLICATIONS

German Search Report, Oct. 18, 1996.

Induktives WegmeβSystem, Steuerungs–UND Regelungstechnik, 1988.

Fluidtechnik Von A Bis Z, Vereinigte Fachverlage–Drausskopf/Ingenieur–Digest, 1989.

Finanziert Sich Selbst, Fluid, 1992.

EPO Search Report, Feb. 6, 1997.

*Primary Examiner*—Kevin Lee
*Attorney, Agent, or Firm*—Dority & Manning

[57] ABSTRACT

In controlling valves, it is desirable for identical stroke changes to result in identical flow changes. To produce a non-linearity between the positioning signal and the valve opening, linearity is achieved between the positioning signal and the quantity of flow. In this case, the required positioning signal, in order to achieve a given opening stroke, is selected so that a linear function is produced between the quantity of flow and the positioning signal. The thus found setting signal is entered into the position regulator to control the valve. The position regulator is equipped for this purpose with a microprocessor circuit which acquires and processes the results of the ascertainment of the working characteristic of the installation.

24 Claims, 6 Drawing Sheets

MICROPROCESSOR-CONTROLLED POSITION REGULATOR

BACKGROUND OF THE INVENTION

Position regulators are used in installations for the control of valves in order to position the travel of stroke or the opening h of the control valve in accordance with a desired parameter. This parameter consists, as a rule, of a given desired flow quantity Q. Interfering and frictional forces in the flow should to be eliminated to a great extent. A given opening h of the valve is therefore associated with a given flow quantity Q. This ratio Q(h) is generally called a working characteristic.

In order to obtain the valve opening h corresponding to a desired flow quantity Q, a controller output position w is fed to the position regulator in the form of an electrical current signal and is compared with the topical opening or lifting position h of the valve. Depending on the result of this comparison, a pneumatic or mechanical positioning force is then fed to the pneumatic positioning drive until position and regulated magnitude (desired-/actual value) coincide.

The conventional position regulators are usually made according to electro-mechanical principles. The travel of stroke h or the opening of the valve is detected mechanically, e.g. through a lever coupling, and is fed back into the position regulator.

Newer designs replace the electro-mechanical system with electronic components, with microprocessors also used. The valve opening h is, in that case, converted into an electrical magnitude, e.g. by a potentiometer, and is compared in a suitable manner, e.g. through the processor software, with the guiding magnitude. These position regulators operate as microprocessor-controlled system as follows:

The controller output w is provided in the form of a current or voltage signal, e.g. by a process computer or also process regulator which calculates the position magnitude W, i.e. signals to trigger the valve via an algorithm formed in the microprocessor-controlled circuit of the computer (calculating process). The processing of the signals as a command and regulating variables is effected via a microprocessor-controlled circuit of the position regulator. Finally the obtained travel of stroke h is ascertained and is fed back via a potentiometer or a contact-less distance measuring system.

It is known that every valve has a certain characteristic valve line $K_v(h)$, which changes however relative to the working characteristic Q(h) depending on the resistances and operating states of the installation into which the valve is built in. For the precision, stability and regulating quality of the regulating circuit of the installation in which the valve is used as a positioning element, it would however be desirable to provide the same travel of stroke changes for the same flow changes. In other words: The working characteristic Q(h) of the system should show the flow Q as a linear function of travel of stroke h, i.e. for all operating states.

It has already been tried to assimilate, at least as much as possible, a linear working characteristic Q(h) by means of chokes, i.e. through mechanical configuration of the valves. However, this is very expensive. Above all, the form of the valve, once it has been designed, is only able to produce a linear working characteristic for one particular operating state. With other operating states and also in other installations, the design of this valve must again be adapted. Also, only an approximately linear attitude is obtained in this manner.

OBJECTS AND SUMMARY OF THE INVENTION

It is a principal objective of the present invention to create a linear working characteristic in a position regulator in a simple manner for a given system into which a valve is built in. Additional objects and advantages of the invention will be set forth in detail in the following description, or will be obvious from the description, or may be learned through practice of the invention.

According to the invention, the objects are attained in that a non-linearity is produced between the setting signal (w) and the valve opening (h) in such a manner that linearity occurs between the setting signal (w) and the flow quantity (q). To control a valve integrated into an installation, the (non-linear) working characteristic Q(h) of the installation is ascertained and is converted into a linear function Q(w). This can be done by connecting a mechanical or electronic transmission element to the position regulator (valve drive) so that the setting signal (w) prescribed to the position regulator for the control of the valve is converted into a valve opening (h) such that a linear function Q(w) is produced.

The working characteristic Q(h) of the installation can be ascertained by different means, e.g. simply through direct measurement of the flow quantity Q as a function of the valve opening h.

Another type of ascertainment is achieved by measuring the input pressure $P_1$ before the valve and the output pressure $P_2$ after the valve as a function of the valve opening h, whereby the working characteristic Q(h) of the installation is determined through computation form this pressure difference while using the values from the characteristic line $K_v(h)$ which is particular to each valve. This method has the advantage that the ascertainment of the working characteristic Q(h) of an installation can be automated with the utilization of a computer, so that the installation adjusts itself automatically in each case for the operating state and/or the control valve being used.

Further details of the invention are explained through the figures.

DETAILED DESCRIPTION OF THE PREFERRED EMBODIMENT

Figure 1:
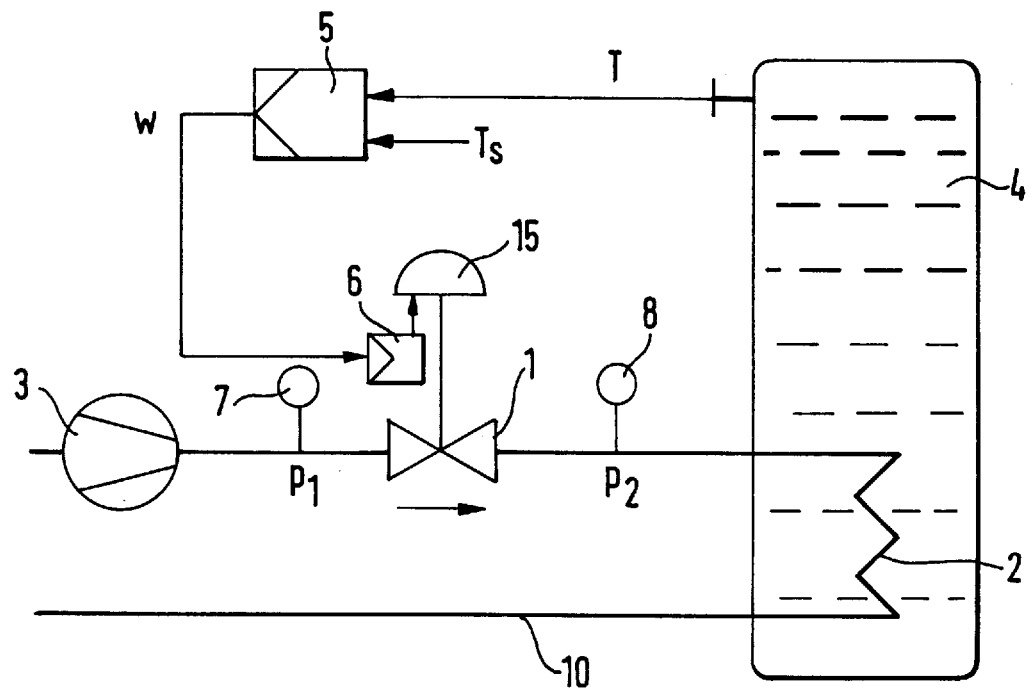
FIG. 1 schematically shows the application of the invention in an installation operating with a liquid medium.

Reference will now be made in detail to the presently preferred embodiments of the invention, one or more examples of which are illustrated in the drawings. Each example is provided by way of explanation of the invention, and not as a limitation of the invention. For example, features illustrated or described as part of one embodiment can be used on another embodiment to yield a still further embodiment. It is intended that the present invention cover such modifications and variations.

The installation according to FIG. 1 consists of a valve 1, a heat exchanger 2 representing consumption resistance, and of a pump 3 which produces the circulation of the medium in the installation. Valve 1 is connected to a position regulator 6 which is in turn connected upstream of a microprocessor or process regulator 5 for its control. Pressure sensors 7 and 8 are installed before and after the valve 1 in order to determine the pressures $p_1$ and $p_2$.

The temperature T is to be controlled in a container 4. It is detected by the process computer 5, is compared there with a desired value Ts and the setting signal w for the valve 1 is ascertained. This setting signal w is fed to the position regulator 6 of the valve 1 which is equipped with a microprocessor 6 or computer circuit (FIG. 3).

Figure 3:
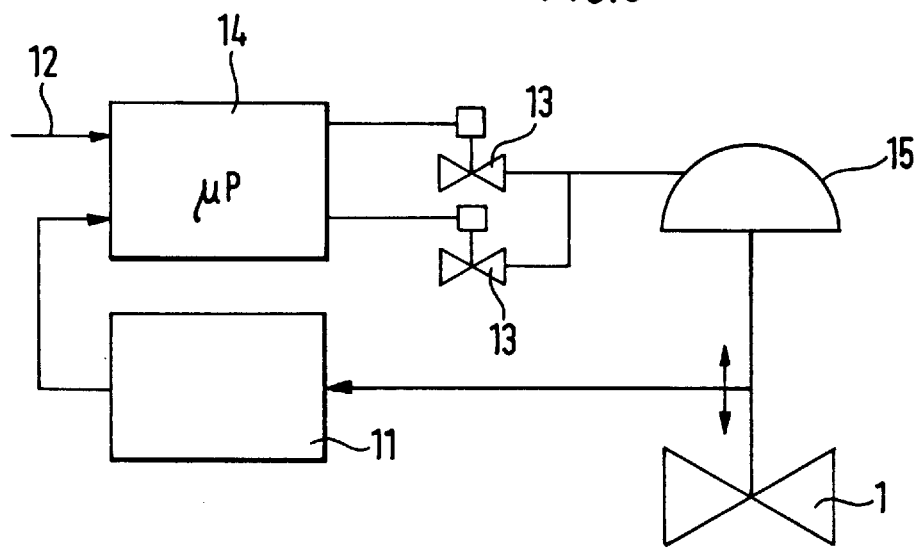
FIG. 3 shows a diagram of the position regulator.
Figure 4:
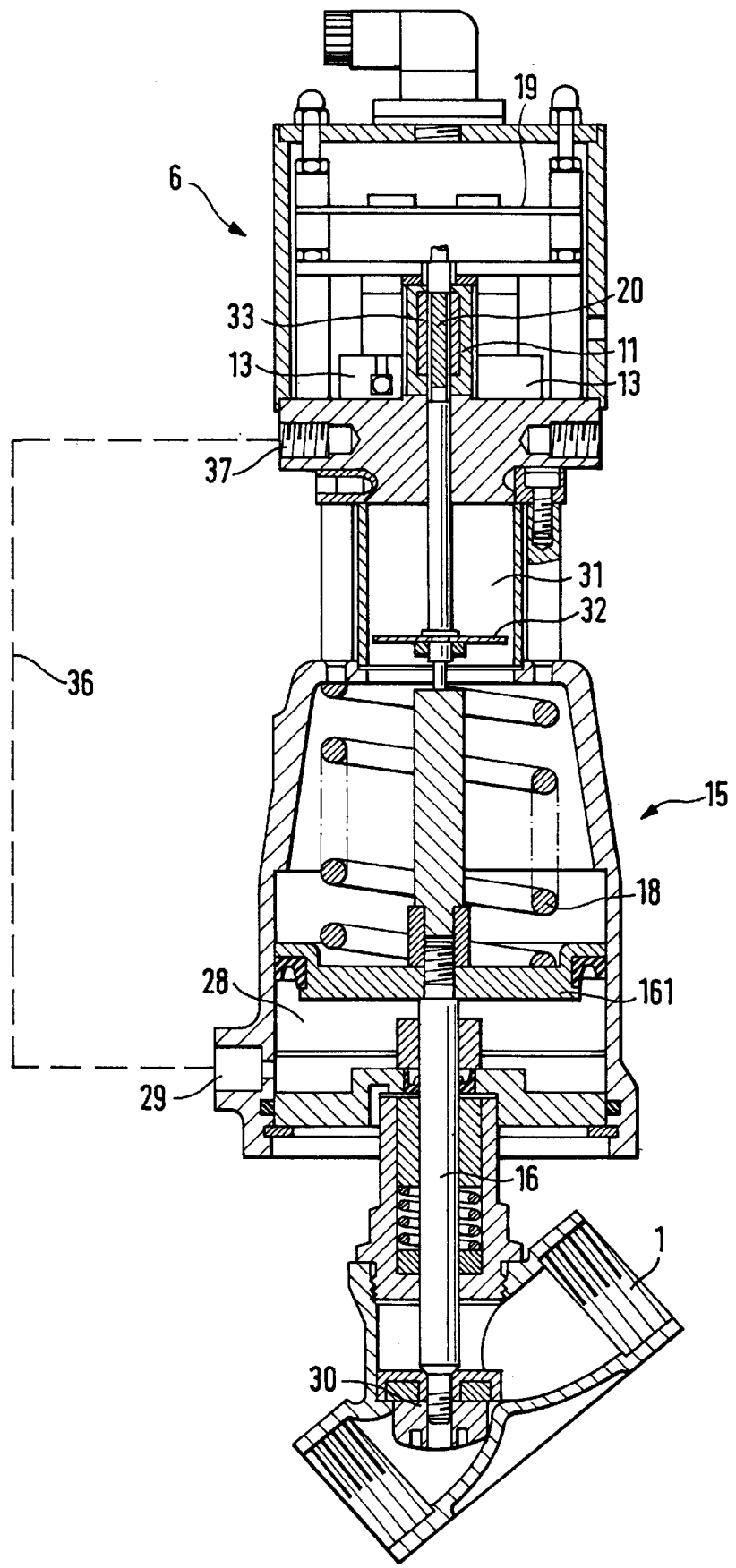
FIG. 4 shows an embodiment according to the invention of a valve with positioning drive.

As shown in FIG. 3, the position regulator 6 comprises a travel-of-stroke sensor 11, microprocessor-controlled regulating electronics 14 with a desired-value input 12 into which the setting signal w is fed, said setting signal w being prescribed by a process regulator 5 as shall be described further below. The regulating electronics 14 in turn transmits the signals it produces to the actuators 13 which control the valve drive 15 which actuates the valve cone 30 via the spindle 16 (FIG. 4). In addition, the regulating electronics 14 are provided with additional inputs for the travel-of-stroke sensor 11 and, if necessary, also for other sensors.

Since a flow of liquid is present in this installation, and since a squared resistance ratio ($\Delta p \sim Q^2$) can be attributed to all the installation components, the working characteristic Q(h) can be calculated according to Bernoulli's laws through the measurements $p_1$ and $p_2$ of the sensors 7 and 8 by means of the microprocessor or computing circuit of the position regulator 6.

Figure 2:
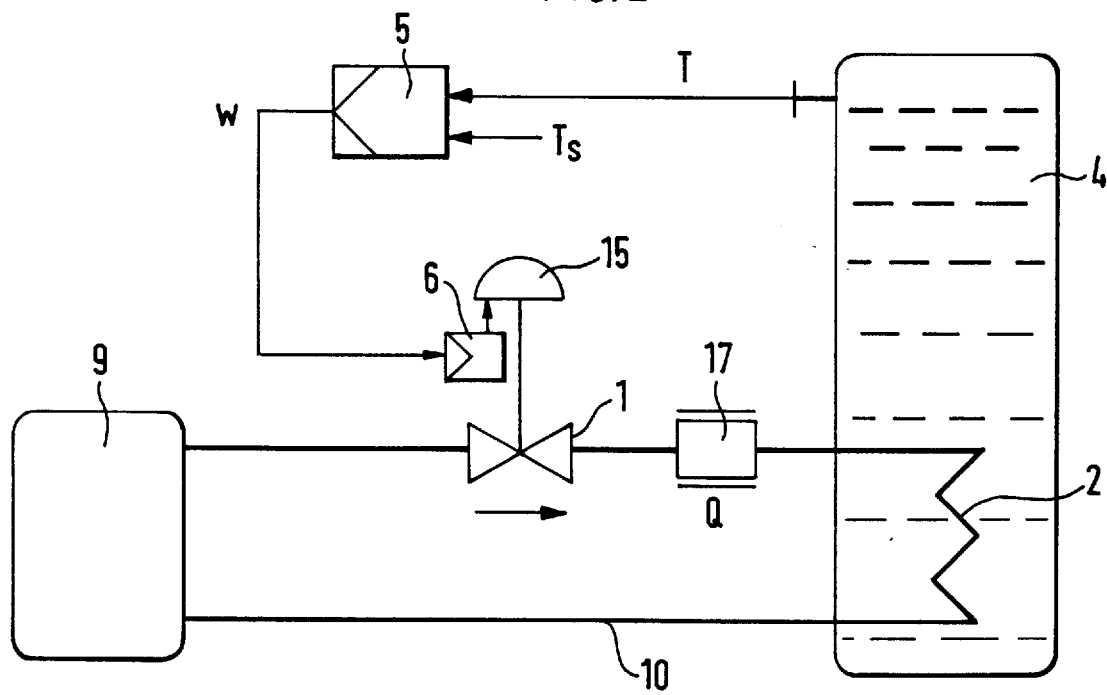
FIG. 2 shows the application of the invention in an installation operating with a gaseous medium.

FIG. 2 shows an installation similar to that of FIG. 1, with the simple difference that an evaporator 9 is installed instead of the pump 3. Similarly to the installation of FIG. 2, the temperature T is to be adjusted in a container 4 in accordance with the wanted temperature Ts. To determine the working characteristic Q(h) a flow meter 17 is provided in the circuit of the pipeline 10.

As a rule, the working characteristic Q(h) of such a system is non-linear. In order to improve the regulating quality of the regulating circuit of this system, the non-linear working characteristic Q(h) of the installation is ascertained and is converted into a linear function (Q(w) (FIG. 5).

This can be effected by different means, e.g. a mechanical or electronic transmission element acting in a wanted non-linear manner can be connected to the position regulator 6. This may be, e.g., a suitably configured cam plate with radii configured in such a manner that a linearity Q(w) is produced. It is however also possible to select such an opening h for the setting signal w that a linear function Q(w) is produced.

Figure 5:
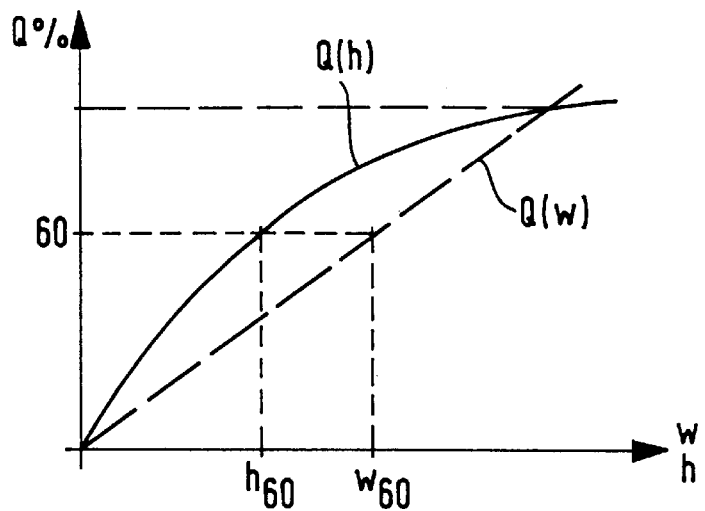
FIGS. 5 to 7 show the different measuring functions and characteristic lines of the installation.

The simplest manner to obtain the working characteristic Q(h) is to measure the flow-through Q as a function of the valve opening h (FIG. 5). It is, however, also possible to use a method by which the input pressure $p_1$ before the valve 1 and the output pressure $p_2$ immediately after the valve 1 are measured and by which the working characteristic Q(h) of the installation is calculated while using the values from the characteristic line $K_v(h)$ of the valve 1.

Figure 6:
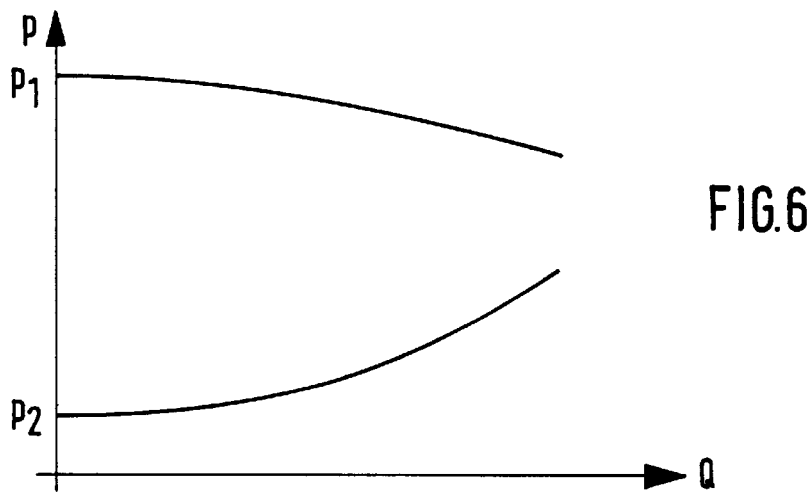

For this purpose the following measures are taken:

1. The mechanical flow resistance behavior of the installation is determined by means of the built-in control valve 1 by measuring the pressures $p_1$ and $p_2$ before and after the valve 1 while attributing the applicable quantity Q. From this two curves are obtained, representing the functions $p_1$ (Q) and $p_2$ (Q) (FIG. 6).

2.a) the next step is the computation of the working characteristic Q(h) representing the connection between the valve opening and the current flow quantity Q by using Bernoulli's equation $\Delta p \sim Q^2$ and taking into account the characteristic valve line indicated by the valve 1 used, or b) in case of a non-Bernoulli resistance behavior of the installation (FIG. 2) and/or of the valve, as occurs for example with gases, laminar currents, cavitation processes and similar operating states, the physical ratios which are known for these cases are used for the computation, or c) the working characteristic is ascertained directly through measurement according to 1. and simultaneously with the measurements of pressures $p_1$ and $p_2$ and the resulting flow Q, the valve opening h is ascertained and is attributed to the flow Q.

Figure 7:
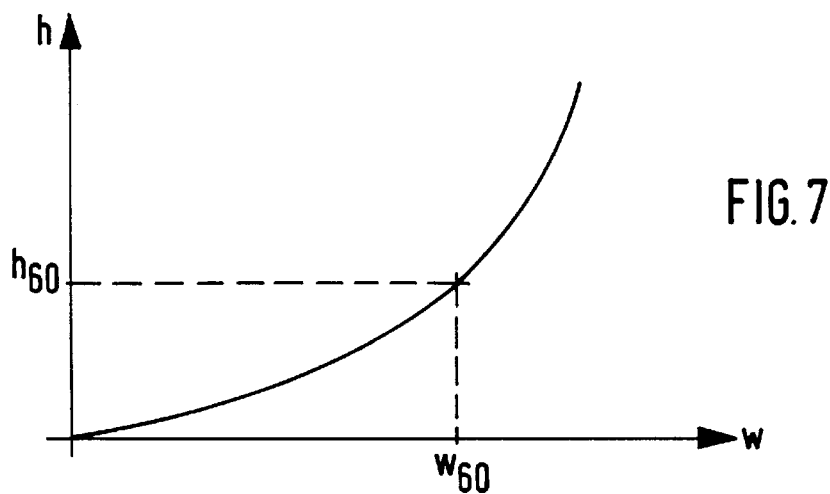

3. The function between valve opening h and the setting signal w which, superimposed upon the working characteristic found according to 2., leads to a linear connection between flow Q and setting signal w, is determined through computation (FIG. 7).

4. By superimposing the two functions according to 2) and 3) a linear function Q(w) results for the flow Q and the setting signal w (FIG. 5)

These measured pressures $p_1$ and $p_2$ can now be entered manually into the program memory of the regulating electronics 14 of the position regulator 6 so that the regulating electronics 14 may calculate the working characteristic according to 2a and 2b. The calculations can however also be done manually, with only the results being entered into the program memory of the regulating electronics 14. As an alternative, it is also possible for the computer of the regulating electronics 14 to be given directly the values for $p_1$ and $p_2$ which were ascertained by means of the pressure sensors 7 and 8 using an appropriate computing program and to carry out the calculations according to 2) to 4). However, all of these calculations can also be made in the process regulator 5, with only the results being transmitted to the regulating electronics 14 of the position regulator 6. In this case, the pressure sensors 7 and 8 must be connected directly to the process regulator 5.

An advantageous further development consists in the integration of the pressure sensors 7 and 8 in the valve 1. By connecting the pressure sensors 7 and 8 directly to the regulating electronics 14, the valve 1 and thereby the installation are given automatic control. The ascertained pressures are transmitted directly into the computer of the regulating electronics 14 for further processing, as stated earlier.

FIG. 4 shows a design of an embodiment of valve 1 in combination with the positioning drive 15 and the position regulator 6. The valve cone 30 of valve 1 is connected via spindle 16 to the valve drive 15 which consists essentially of the drive piston 161 and the readjusting pin 18. The drive piston 161 is powered through an air connection opening 29 and an air chamber 28 to displace the valve cone 30. This positioning drive 15 is set directly on the valve 1 and is centered on the valve spindle 16.

The position regulator 6 is connected at its output opening 37 by a control line 36 to the air connection opening 29 of the setting drive 15. The arrival of air into the air chamber 28 for the setting drive 15 of the valve 1 is controlled via actuators 13.

The position regulator 6 is set on this positioning drive 15 and is also centered on the valve spindle 16. This results in a very compact and simple construction without additional transmission elements leading to imprecision. The viewing window 31 located between the valve drive 15 and the position regulator 6, with the display 32 located on the valve spindle 16, makes it possible to read the valve position. The valve spindle 16 extends into the position regulator 6 and is provided at its upper end with a travel-of-stroke sensor 11. Electronic plates 19 which also contain the microprocessor 14 of the position regulator 6 are located above the travel-of-stroke sensor 11.

The travel-of-stroke sensor 11 can be made in different manners. Preferably, the travel-of-stroke sensor 11 is made in the form of a magnetic-inductive system and functions without contact. This results in a particularly reliable design, since on the one hand no movable parts such as levers etc. need be accessible from the outside, and on the other hand the detection of travel of stroke device does not wear and is insensitive to vibration. This is the condition for precise and exact control and regulation of the valve opening h.

Figure 8:
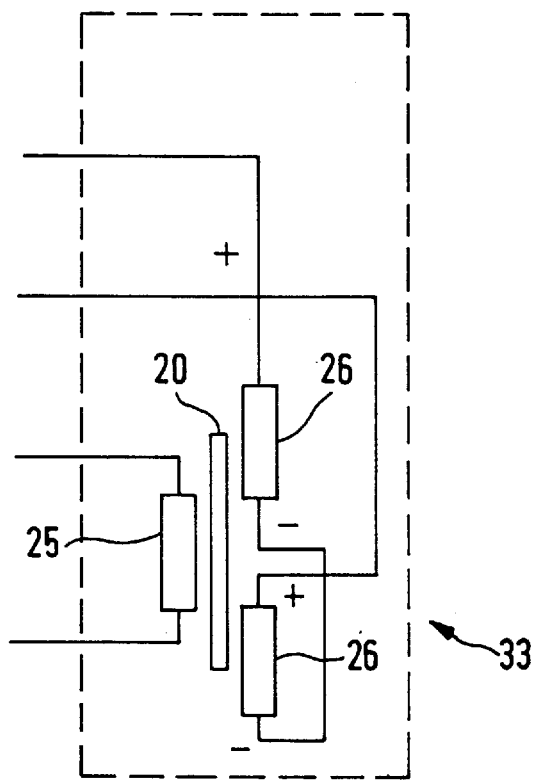
FIG. 8 shows the basic wiring diagram of an inductively working travel of stroke sensor according to the invention.

FIG. 8 shows the construction and the functioning principle of the magnetic-inductive travel-of-stroke sensor 11 in a diagram. The extension of the valve spindle 16 supports at its end a ferrite core 20 which is moved up and down in a coil 33 in accordance with the stroke h of the valve cone 30. As a function of its position within the coil 33, a corresponding current or voltage is produced inductively as a measure for the valve opening h. It is a particularity of the travel-of-stroke sensor 11 that the coil 33 has one primary winding 25 and two secondary windings 26, whereby the two secondary windings 26 are coaxially in a row but are connected against each other. This means that the output (−) of the first secondary winding 26 is not connected to the input (+) of the second secondary winding but to its output (1). The positioning movement of the valve spindle 16 causes the ferrite core (20) to be positioned inside the coil (33) and a corresponding current signal I is induced. If the position of the ferrite core 20 is symmetrical between the two secondary coils 26, the current signal produced is zero because the inductions of the two coils 26 cancel each other out. In the final positions a plus or minus current signal is produced. It is also possible however to use a voltage signal instead of the current signal. This circuit has the advantage that it can be used to obtain a nearly linear course of the current signal I for the valve opening h, this being important for the precision of regulation, as mentioned in the beginning.

Figure 9:
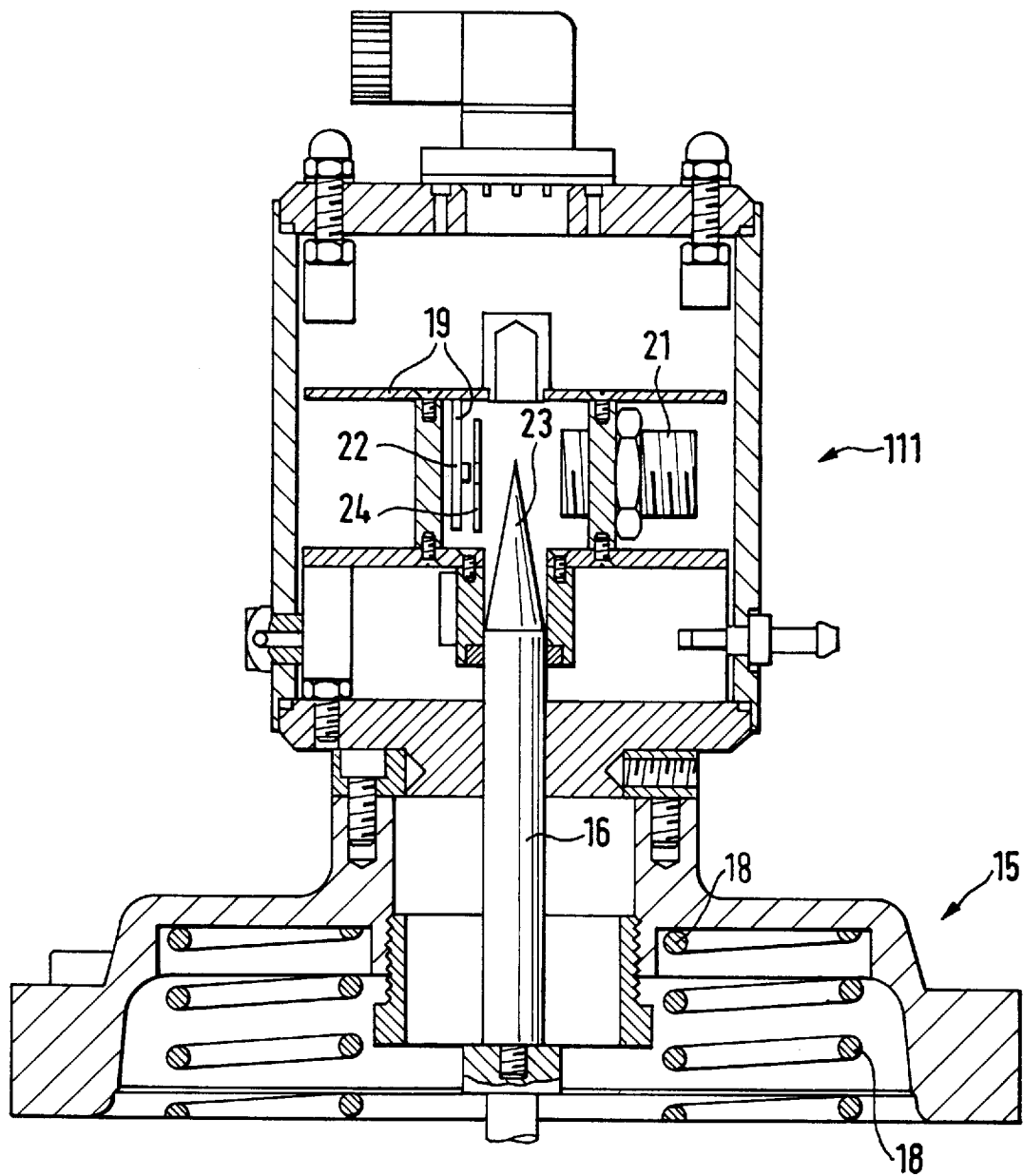
FIG. 9 shows the position regulator with another embodiment of a contact-less travel of stroke sensor.

The travel-of-stroke sensor III of FIG. 9 operates according to an optical principle. At the end of the extended valve spindle 16 a covering diaphragm 23 is attached instead of the ferrite core 20. This covering diaphragm 23 is of conical design so that an exact right-angle adjustment for the path of light rays is not necessary.

A slit diaphragm 24 is installed in front of a photocell 22 and is covered by the covering diaphragm 23 as a function of the travel of stroke h of the valve spindle 16 so that light emerging from the photo diode 21 is freed to a greater or lesser extent for the photocell 22. As a result, a photoelectric current or voltage is produced which corresponds to the angle of incidence of the light and thereby to the position of the covering diaphragm 23. This serves here too as a measure of the valve opening h. Linearization of the function I(h) can also be achieved through the configuration of the surface line of the covering diaphragm 23.

An especially advantageous embodiment of the travel-of-stroke sensor 111 consists in a variant of the photocell 22 such that the light rays entering through the slit diaphragm 24 are intercepted by a very large number of the smallest individual photo elements, so-called photo-bits, which emit the digitally directly usable signals instead of a photocell, as a function of the number of them which are exposed to the light rays emitted by the photo diode 21 as a function of the position of the covering diaphragm 23. These signals can be fed directly to the microprocessor 14 for processing, without having to be edited first by digitalizing. This type of photoelectric scanning has furthermore the advantage that the measurements are independent of the constancy of the light intensity.

The described, contact-less travel-of-stroke sensors can be used advantageously in the application of the process for the linearization of the working characteristic Q(h), as well as independently of it. The described travel-of-stroke sensors functioning on inductive as well as under optical principles contribute to a linearization of the regulating magnitudes, even if only in the area of travel-of-stroke sensors if used alone.

As was already mentioned, the conversion of the non-linear working characteristic Q(h) of the installation into a linear function Q(w) can also be achieved by means of a mechanical or electronic transmission element functioning in a purposefully non-linear manner which is connected to the position regulator 6.

Figure 10:
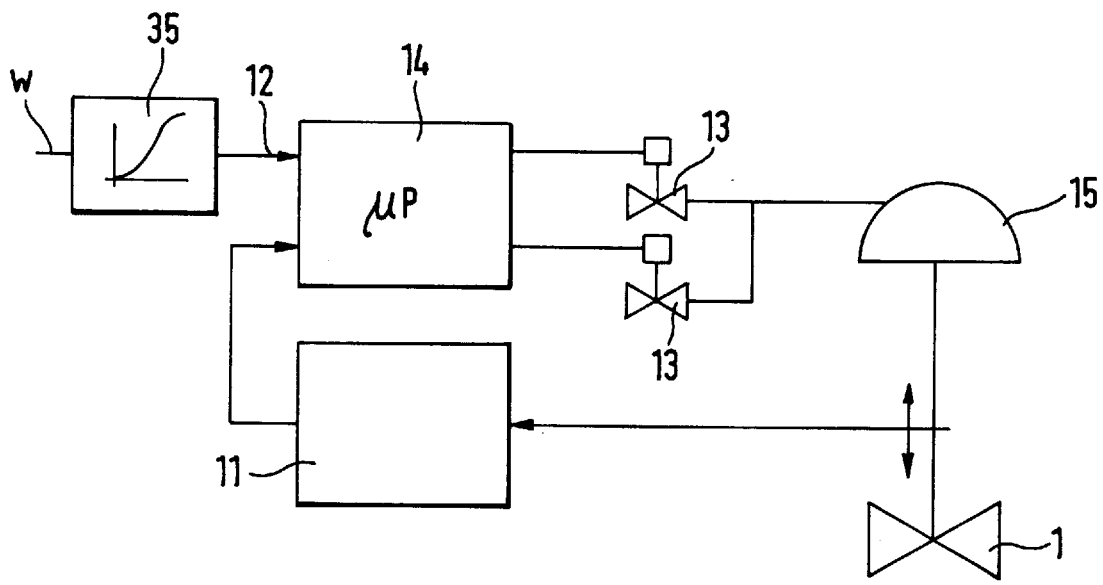
FIGS. 10 and 11 show the position regulator according to FIG. 3, but with connected, non-linear, mechanical or electrical transmission element.

FIG. 10 shows the connection of an electrical transmission element 35 to the position regulator 6. The setting signal w coming from the process regulator in this case first goes through the electrical transmission element 35 before it reaches input 12 of the regulating electronics 14 of the position regulator 6. The connected transmission element 35 is superimposed on the setting signal w just as the programmed function h(w), so that the linear function Q(w) is produced which then, as described earlier, is formed by the regulating electronics 14.

Figure 11:
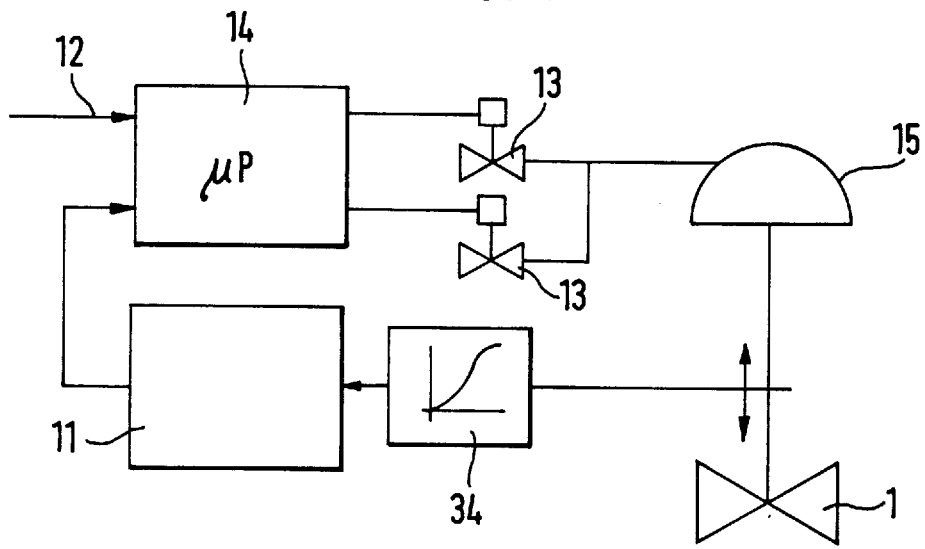

When a mechanical non-linear transmission element 34 is used (FIG. 11), it is advantageously intercalated between the valve drive 15 and the travel-of-stroke sensor 11 of the position regulator, whereby the mechanical transmission element 34 is programmed so that a value such as to produce a linear function Q(w) is added to the valve opening h fed back to the travel-of-stroke sensor 11. The nonlinear mechanical transmission element 34 can be made in the form of a cam disk with radii that are such as to produce linearity Q(w) or can be made in form of a potentiometer acting in a corresponding non-linear manner. It will be apparent to those skilled in the art that various modifications and variations can be made in the invention without departing from the scope and spirit of the invention. It is intended that the present invention cover such modifications and variations as come within the scope of the appended claims and their equivalents.

I claim:

1. A process for controlling a valve that is operably disposed in an installation wherein the valve controls the flow of a fluid medium in the installation by changing a position of an opening in the valve in response to a setting signal generated by a position regulator associated with the valve, said process comprising:

measuring flow quantity of the fluid medium through the valve;

defining a non-linear working characteristic of the valve as a function of a non-linear relationship between flow quantity and another operating characteristic of the valve;

converting the non-linear working characteristic into a linear characteristic of the valve as a function of flow quantity and a third operating characteristic of the valve; and controlling the valve opening position for desired flow quantities with setting signals generated according to the converted linear characteristic.

2. The process as in claim 1, wherein said defining a non-linear characteristic comprises defining a non-linear function according to a non-linear relationship between flow quantity and valve opening position.

3. The process as in claim 2, wherein said converting the non-linear characteristic into a linear characteristic further comprises defining a working characteristic of the valve as a function of valve opening position and setting signal value and superimposing this working characteristic with the non-linear characteristic of flow quantity and valve opening position to generate a linear characteristic as a function of flow quantity and setting signal value.

4. The process as in claim 1, wherein said measuring flow quantity of the fluid medium comprises measuring an input pressure of the fluid medium before the valve and output fluid medium pressure after the valve as a function of valve opening position.

5. The process as in claim 4, further comprising incorporating a characteristic line of the valve into said measuring of the input and output pressures of the fluid medium as a function of valve opening position.

6. The process as in claim 4, comprising transmitting the input and output pressures of the fluid medium to a computer for processing, and carrying out said converting of the non-linear characteristic to a linear characteristic with the computer, and generating the setting signals for said controlling of the valve opening positions with the computer.

7. A controllable valve system for use in an installation wherein flow quantity of a fluid medium through said installation is controlled, comprising:

a valve, said valve having a variably positionable opening defined therein for regulating flow quantity of said fluid medium through said valve, said opening controlled by a valve drive mechanism;

a position regulator operably configured with said valve drive mechanism, said position regulator transmitting a setting signal to said valve drive mechanism to controllably vary said opening;

a position sensor disposed to sense a current position of said valve opening, said sensor in communication with said position regulator to transmit said valve opening position thereto; and regulating control means associated with said position regulator for generating said setting signals as a linear function of a desired said flow quantity, said regulating control means comprising means for acquiring non-linear working characteristics of said valve and generating said linear function from said non-linear working characteristics.

8. The system as in claim 7, wherein said regulating control means comprises pressure sensors disposed to sense input pressure of said fluid medium before said valve and output pressure of said fluid medium after said valve, said non-linear working characteristics comprising flow quantity and valve opening position, said flow quantity calculated by said regulating control means.

9. The system as in claim 8, wherein said sensors are integral with said valve.

10. The system as in claim 7, further comprising a flow meter operably disposed relative to said valve to measure flow quantity through said valve, said flow meter in communication with said regulating control means.

11. The system as in claim 10, wherein said flow meter is integral with said valve.

12. The system as in claim 7, wherein said valve drive mechanism further comprises an axial extension and a drive spindle, said position regulator operably disposed in said axial extension of said valve drive mechanism and centered on said drive spindle.

13. The system as in claim 12, wherein said valve drive mechanism is one of a pneumatic or hydraulic device.

14. The system as in claim 7, wherein said valve drive mechanism comprises a movable member for varying said valve opening, said position sensor comprising a contact-less sensor that does not contact said movable member.

15. The system as in claim 14, wherein said contact-less sensor is a magnetic inductive sensor.

16. The system as in claim 14, wherein said contact-less sensor is a photo-electric sensor.

17. The system as in claim 16, wherein said photo-electric sensor comprises a photo diode with a movable diaphragm covering attached to a valve spindle of said valve drive mechanism.

18. The system as in claim 17, wherein said photo diode comprises a plurality of photobits which individually emit direct usable signals.

19. The system as in claim 18, wherein said photobits are in communication with said regulating control means.

20. A controllable valve system for use in an installation wherein flow quantity of a fluid medium through said installation is controlled, comprising:

a valve, said valve having a variably positionable opening defined therein for regulating flow quantity of said fluid medium through said valve, said opening controlled by a valve drive mechanism;

a position regulator operably configured with said valve drive mechanism, said valve drive mechanism controllably varying said opening in response to setting signals generated by said position regulator;

a position sensor disposed to sense a current position of said valve opening, said sensor in communication with said position regulator to transmit said valve opening position thereto; and a transmission element configured with said position regulator for generating a non-linear characteristic function, said position regulator comprising means for using said non-linear characteristic function to generate said setting signals as a linear function of desired flow quantities.

21. The system as in claim 20, wherein said transmission element is operably disposed between said position sensor and said valve drive mechanism.

22. The system as in claim 20, wherein said transmission element is a mechanical transmission element.

23. The system as in claim 22, wherein said mechanical transmission element is a cam having a non-linear curve.

24. The system as in claim 20, wherein said transmission element is an electrical transmission element.

* * * * *